Sept. 27, 1949.  A. SCHWARZ  2,483,025
CAMERA SHUTTER MECHANISM WITH FOCUSING STOP
Original Filed April 28, 1945  4 Sheets-Sheet 2
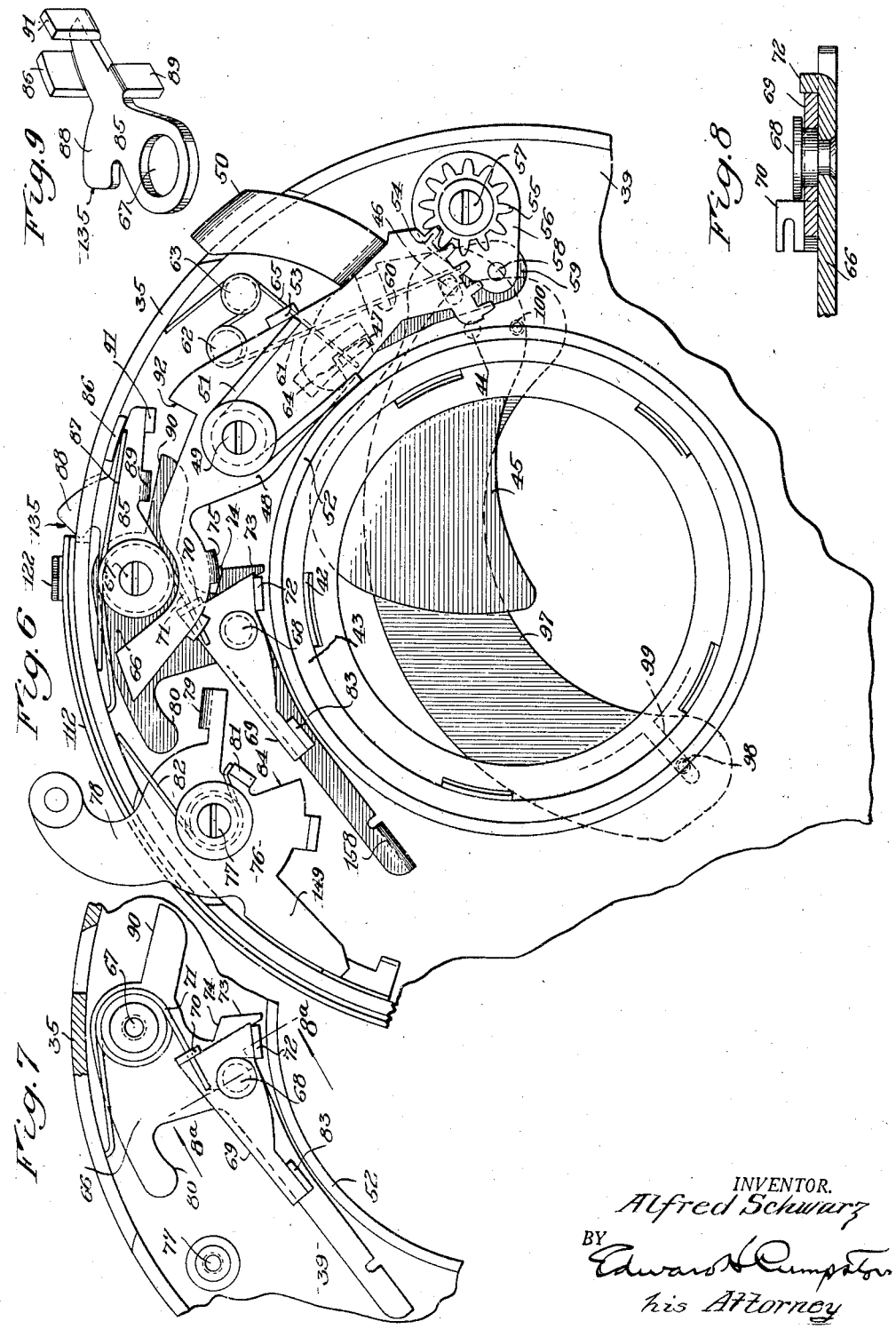
INVENTOR.
Alfred Schwarz
BY
Edward H. Cumpston
his Attorney Sept. 27, 1949. A. SCHWARZ 2,483,025
CAMERA SHUTTER MECHANISM WITH FOCUSING STOP
Original Filed April 28, 1945 4 Sheets-Sheet 3
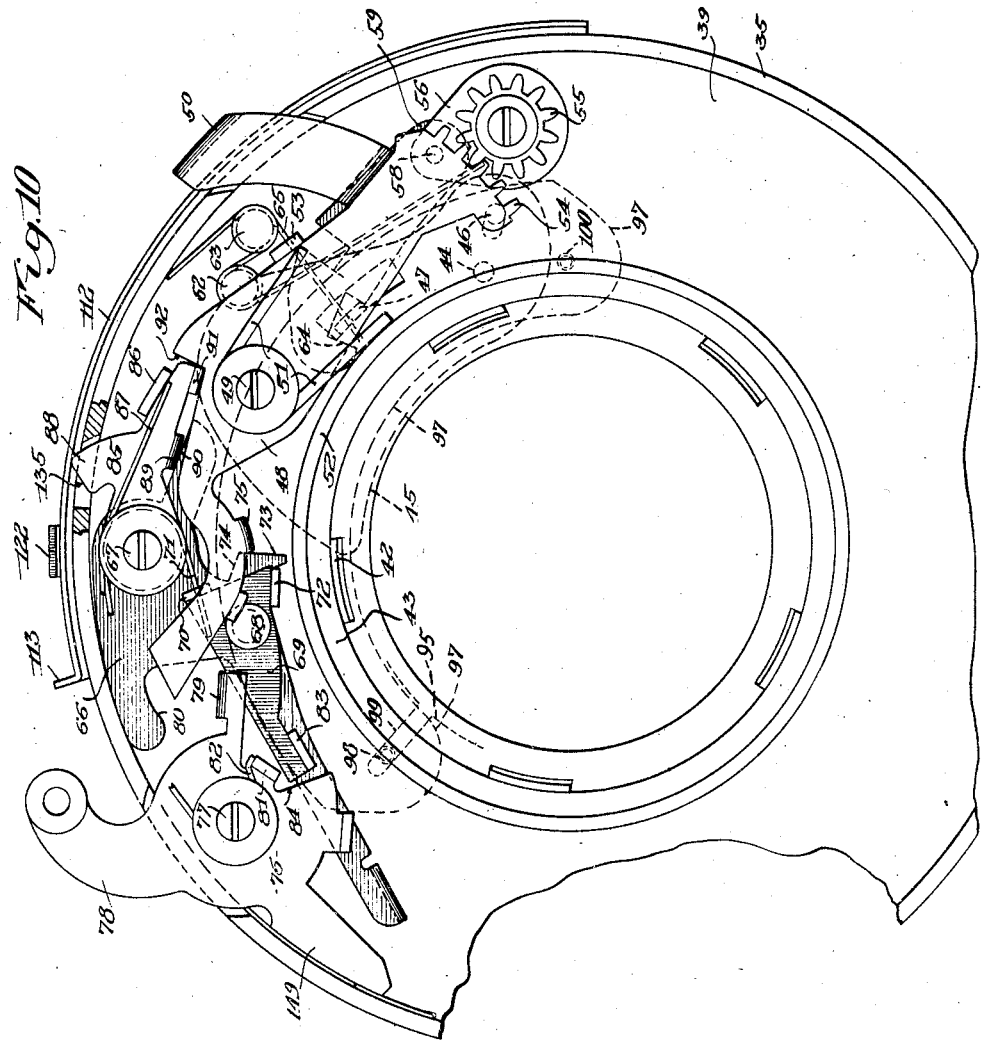
INVENTOR.
Alfred Schwarz
BY Edward H. Cumpston
his Attorney

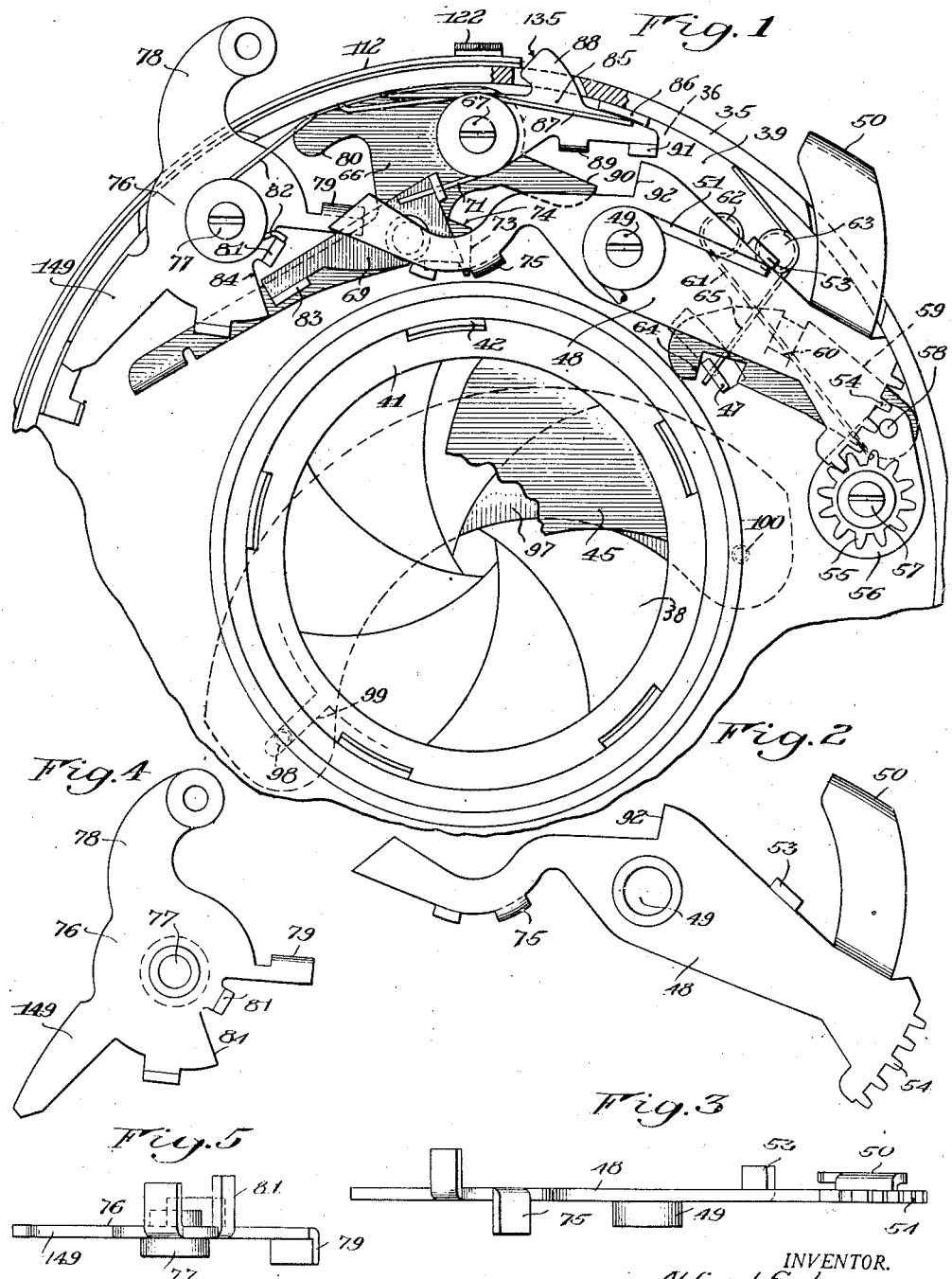

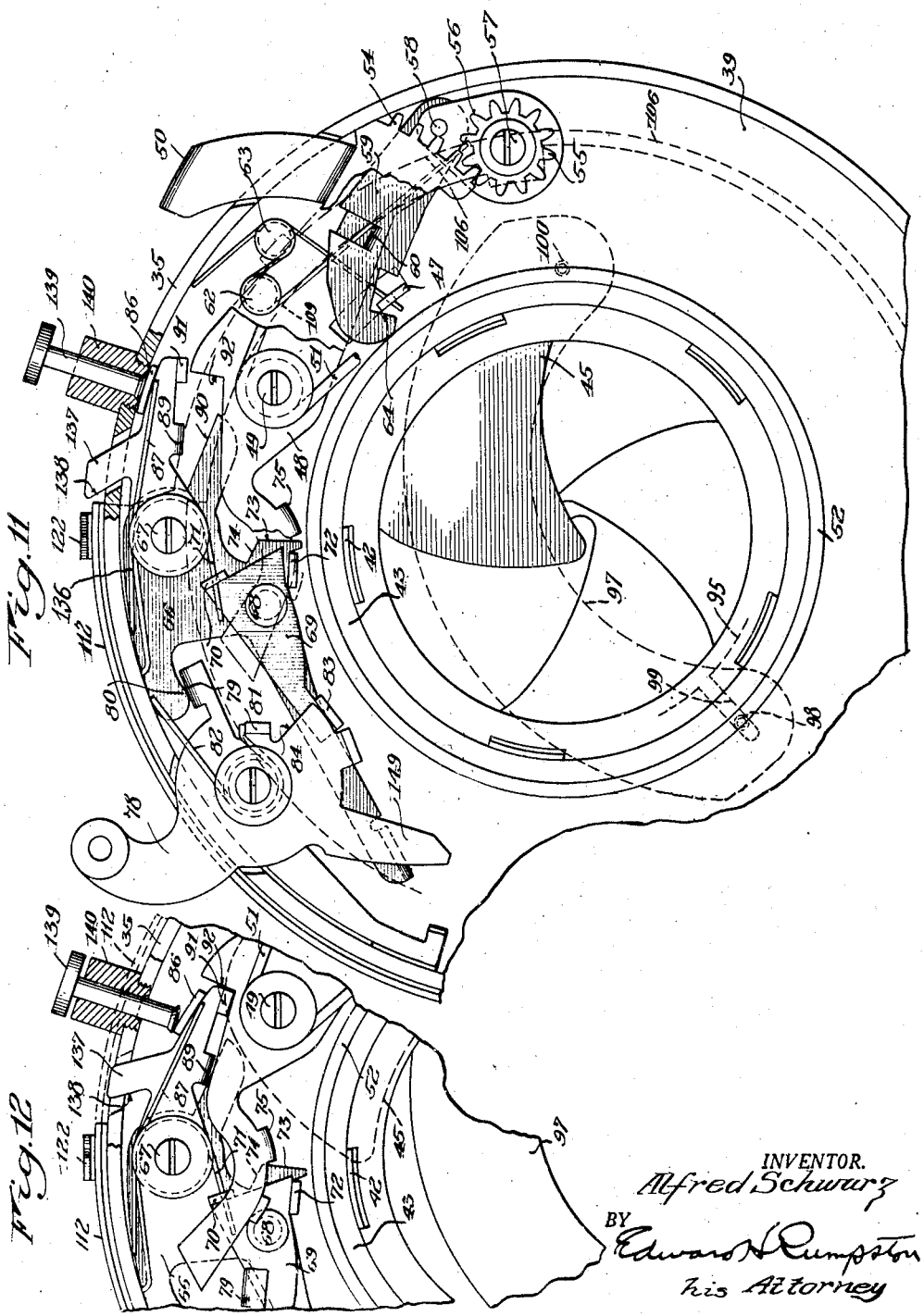

Patented Sept. 27, 1949

2,483,025

UNITED STATES PATENT OFFICE 2,483,025

CAMERA SHUTTER MECHANISM WITH FOCUSING STOP

Alfred Schwarz, Rochester, N. Y., assignor to Ilex Optical Company, Rochester, N. Y., a corporation of New York Original application April 28, 1945, Serial No. 590,770. Divided and this application April 15, 1946, Serial No. 662,343

8 Claims. (Cl. 95—63)

This invention relates to mechanism for opening and closing the blades of a shutter of the setting type, for focusing a camera. The ordinary camera may be focused by setting the shutter for "Time" operation which, however, involves a multiplicity of manipulations and setting and resetting adjustments, some of which are apt to be forgotten with resulting failure in exposure. It has been proposed to partially remedy these difficulties by providing special constructions for opening the shutter blades for focusing, but these constructions have continued to require a number of operations, some of which may be forgotten and which are difficult to accomplish with the fingers of one hand while steadying the camera with the other. Some of these constructions, furthermore, have involved temporary detachment of normally connected shutter parts which tends to cause derangement and injury of the parts.

One object of the invention, therefore, is to provide an improved shutter mechanism of a more simple, practical and convenient character, requiring a minimum of manipulations adapted to be readily accomplished by the fingers of one hand, independently of operation of the normal trigger release means and without disturbing the setting of the shutter for a predetermined exposure period.

Another object is to provide an improved shutter mechanism in which, after the setting of the master member, the blades may be opened for focusing and closed again by merely moving the master member to set position as in the normal operation of the shutter, so as to require a minimum of manipulation and likelihood of error.

Another object is to provide an improved shutter in which the opening of the blades for focusing is accomplished through the use of the normal shutter connections and without requiring their detachment, so as to avoid the likelihood of derangement and injury of the parts.

A further object is to provide such a mechanism capable of being operated by a single actuation with one finger to open the blades by the normal opening action of the master member and of being operated by a single actuation with one finger to close the blades by the resetting of the shutter ready for use, so that the focusing operations may be accomplished by a minimum of use of the photographer's hands and with a minimum likelihood of error in operation.

A still further object is to provide such a mechanism in which the opening of the blades for focusing disables the usual trigger release, and the blades are closed again ready for taking a picture by a resetting movement of the master member to further reduce the likelihood of error in the operation of the shutter and any associated mechanism.

To these and other ends the invention resides in certain improvements and combinations of parts, all as will be hereinafter more fully described, the novel features being pointed out in the claims at the end of the specification.

In the drawings:

Fig. 1 is a front elevation, partly broken away, of shutter mechanism embodying the present invention and shown with the parts in initial and unset position with the shutter closed;

Fig. 2 is a front elevation of the master member, detached;

Fig. 3 is an edge view of the same;

Fig. 4 is a front elevation of the release member or trigger, detached;

Fig. 5 is a side elevation of the same;

Fig. 6 is a view similar to Fig. 1, but showing the master member moved to set position;

Fig. 7 is a detail view of locking member parts shown in Fig. 6;

Fig. 8 is a sectional view on the line 8a—8a in Fig. 7;

Fig. 9 is a perspective view of a latch member shown in Fig. 6;

Fig. 10 is a view similar to Fig. 6, but showing the shutter open for focusing;

Fig. 11 is a view similar to Fig. 1, but showing a modified construction with the parts in initial and unset position, and Fig. 12 is a detail of parts shown in Fig. 11, but with the shutter open for focusing.

The invention is embodied in the present instance in association with camera shutter mechanism of the between-the-lens type, the shutter comprising a motor or master member adapted to be set to position to tension spring actuating means for opening and closing the shutter blades on release by a release member or trigger.

Referring more particularly to the drawings, the present embodiment preferably comprises an annular shutter casing having a cylindrical wall 35 (Fig. 1) and a rear wall 36 provided with a flange (not shown) for supporting rear lens means over the usual exposure opening 38. The front of the casing is closed by cover means (not shown) attached to the front end of the cylindrical wall 35, as well understood in the art. An annular partition or mechanism plate 39 (Fig. 1) is mounted within the cylindrical wall 35, preferably against the inner surface of the rear wall 36, the shutter mechanism being mainly mounted on plate 39. Fixed to the rear face of plate 39 is an annular plate 41 from which are struck up forwardly a number of lugs 42. Supported for oscillation on these lugs is a shutter blade ring 43 provided with pins 44 (Fig. 6) rotatably engaged in openings in a plurality of shutter blades 45, respectively, each blade being pivotally connected by a pin and slot as at 46 with the casing, so that oscillation of the blade ring serves to open and close the shutter blades. The blade ring has a lug 47 projecting forwardly through an opening in the plate 39 for actuation of the blade ring by the master member, which will now be described.

The master member is preferably in the form of a lever 48 (Figs. 1 and 2) pivoted at 49 on the plate 39 and having a handle or finger piece 50 projecting through an opening in the casing wall 35. A spring 51 is coiled about this pivot of the lever with one end resting against an inner circular flange 52 of the plate 39 and the other end against a lug 53 on the lever, so as to normally turn the lever in a counter-clockwise direction. The end of the lever adjacent its handle 50 is formed with a circular toothed part or rack 54, meshing with a pinion 55 fixed on a wrist plate 56 rotatably mounted at 57 on the plate 39. Plate 56 is pivotally connected at 58 with one end of a link 59 having a lug 60 against which bears one end of a spring 61 coiled about a post 62 on the plate 39 with its other end bearing against a post 63 on the plate. Link 59 is formed with a rectangular notch 64 for engagement with lug 47 of the blade ring in the position to which the link is moved by the setting of the master member as in Fig. 6. A spring 65 coiled about the post 63 bears at one end against the casing flange 35 and at the other against lug 47 so as to normally rotate the blade ring clockwise to close the blades.

In the initial position of the master lever, as shown in Fig. 1, the free end of link 59 rides on flange 52 of plate 39, the other or pivoted end of the link being in its outward position and tilting the link to cause its recess 64 to pass over lug 47 without engagement during movement of the link toward the left. Setting depression of the master lever handle 50 swings wrist plate 56 to move the link idly toward the left, as its pivot 58 is swung from its outer position shown in Fig. 1 to the inner position shown in Fig. 6. The master lever is releasably locked in this set position by means hereafter described and in this position the blade ring lug 47 is engaged in the notch 64 of the link. On release of the master lever and outward movement of the pivot 58, the link 59 is first moved toward the left to move the blade ring counter-clockwise and open the blades and, as the pivot 58 passes dead center, is moved toward the right to move the blade ring clockwise and close the blades, assisted by the blade ring spring 65, thus returning the parts to the position shown in Fig. 1.

The master lever is locked in set position by means of an irregularly shaped locking lever 66 (Figs. 1, 6 and 7) pivoted at 67 on plate 39. Pivoted on the locking lever at 68 is a pawl 69 having a lug 70, and a spring 71, coiled about the pivotal support of the locking lever, bears at one end against the casing and at the other against lug 70 of the pawl so as to turn the pawl clockwise on its pivot against a stop lug 72 on the lever 66, this arrangement serving also to turn the locking lever 66 in a counter-clockwise direction. Lever 66 is formed with a radially extending shoulder 73 and with a shoulder 74 extending transversely thereto, both for cooperation with a rearwardly extending lug 75 on the master lever. As the master lever is set from the position shown in Fig. 1 to that shown in Fig. 6, its lug 75 rides up the shoulder 73 of the locking lever until it reaches shoulder 74 of the lever which is then turned counter-clockwise by its spring to engage under and hold the master lever in set position until released by one of the means hereafter described.

The locking lever 66 is normally released by the releasing member or trigger, an irregularly shaped plate or lever 76 pivoted at 77 on plate 39 and having a manually operated handle 78 extending outwardly through an opening in the casing. Release lever 76 has an arm 79 arranged during counter-clockwise rotation to engage the heel 80 of the locking lever to turn it clockwise so as to withdraw shoulder 74 from beneath the lug 75 of the master lever and release the master lever for rotation counter-clockwise by its spring to open and close the shutter blades as described. Trigger 76 has a lug 81 engaged by one end of a spring 82 coiled about the pivot support of the trigger and having its other end bearing against the casing to turn the trigger in a clockwise direction and restore it to initial position.

Means are provided for locking the releasing lever or trigger in its initial or inactive position except when the master lever is moved to set position, for the purpose of preventing operation of the trigger in certain positions of the mechanism. To this end, the pawl 69 on the locking lever has at its free end a lug 83 positioned for engagement, in one position of the locking lever, with a radial shoulder 84 on the releasing lever 76. In the unset position of the master lever shown in Fig. 1, the locking lever is held turned in a clockwise direction by engagement of the lug 75 of the master lever with the radial shoulder 73 of the locking lever and in this position of the locking lever the lug 83 of its pawl 69 is raised into the path of the shoulder 84 of the releasing lever so as to lock it against actuating movement. In the set position of the master lever, however, its lug 75 releases shoulder 73 of the locking lever, permitting the latter to move counter-clockwise so that the lug 83 of its pawl is below the path of movement of shoulder 84 of the trigger, thus releasing the trigger for movement to trip the locking lever 66 and release the master lever for opening and closing the shutter blades.

In the common type of shutter construction, the shutter may be set for "Time" operation and the blades opened for focusing and subsequently closed again by actuations of the releasing lever or trigger, but I have found that such focusing opening of the blades may be accomplished in a much more simple, practical and convenient manner and with less likelihood of error. For this purpose, the invention comprises an auxiliary releasing means or latching lever 85 (Figs. 1 and 9), pivoted on the same post support as the locking lever for cooperation with the latter and with the master lever. Latching lever 85 has a lug 86 against which bears one end of a spring 87 coiled about the pivotal support and having its other end bearing against the casing to turn the lever in a counter-clockwise direction and project a lug or finger piece thereof 88 through an opening in the casing. Latch lever 85 has a rearwardly turned lug 89 positioned for engagement with an arm 90 of the locking lever 66 for tripping the locking lever. Projecting forwardly from the latching lever is a lug 91 in position to engage a radial shoulder 92 on the master lever 48 and hold it in partially actuated position after it has moved to open the shutter blades but before completing its movement to close them.

It will be seen from this construction that with the master lever locked in set position by the locking lever 66 (Fig. 6), the arm 90 of the locking lever is raised adjacent lug 89 of the latch lever 85 and lug 91 of the latch lever is spaced from shoulder 92 of the master lever. In such position of the parts, finger piece 88 may be depressed manually, or by means hereafter described, to turn the latch lever clockwise, with the result that it trips the locking lever 66 and shortly thereafter relatches the master lever by interposing its lug 91 in the path of movement of shoulder 92 of the master lever. These parts are so proportioned and arranged that the master lever is relatched on full opening of the blades, so that the blades are held in fully opened focusing position. The engaging faces of the latch lever lug 91 and the master lever shoulder 92 are preferably so inclined or undercut as to releasably hold these parts in latching engagement with each other.

To again restore the blades preparatory to making an exposure, finger piece 50 of the master lever is depressed to reset it and such resetting movement releases the latching lever 85 for return to inactive position and releases the locking lever 66 for actuation by its spring to latch the master lever in set position, with the trigger 78 released ready for operation to make an exposure.

With the master lever in set position, preparatory to making an exposure, such opening of the shutter blades for focusing may be readily accomplished by the index finger of the right hand by merely depressing the finger piece 88 of the latch lever. After focusing, the blades are closed with the same finger by depressing the finger piece 50 to reset the master lever. The camera may thus be steadied with one hand and operated for focusing with the other by the two simple steps of first depressing the latch lever 85 and then depressing the master lever handle 50 to reset it, with a minimum of manipulations and leaving the operating hand free without having to manually hold any operating part or lever in position. It will be noted also that this operation is accomplished by a relatively simple mechanism composed of but a few parts of practical construction and that such operation employs the regular connections between the shutter parts in their regular and automatic opening action, without any detachment or disconnection of such parts likely to result in their derangement or injury. After opening the blades and focusing the camera, no special focusing operation is required to close the blades but only the resetting of the master lever in the normal and usual procedure for taking a picture, thus reducing the likelihood of error. Such simplification of the construction and operation is of added importance, to avoid the spoiling of exposures and wastage of lamp bulbs, where the shutter parts are combined with a synchronizer mechanism as disclosed in my co-pending patent application, Serial No. 590,770, filed April 28, 1945, now Patent No. 2,480,973, dated Sept. 6, 1949, of which the present application is a division.

In the preferred embodiment described above, the finger piece 88 is formed with an inclined or cam face 135 (Fig. 1), normally lying in the path of movement of the leading edge of an arcuate flange 112 on a ring 106 mounted on the casing for oscillating adjustment to different positions concentric with the optical axis, and having an upturned adjusting finger piece 113 (Fig. 11). Ring 106 is connected with a plate 95 formed with a series of slots 99 each engaged by a trunnion 98 on one end of each of a series of diaphragm blades 97. The other end of each blade is formed with a trunnion 100 engaging a concentrically adjustable plate (not shown) carrying an operating finger piece 122. By means of flange 112 and its finger piece 113, the blades 97 may be adjusted at one end to open the diaphragm blades as required for focusing, while finger piece 122 may be moved to adjust the other ends of the blades to produce a desired exposure aperture, as more fully described in my copending patent application, Serial No. 662,344, and forming no part of the present invention.

The clockwise movement of flange 112, to open the diaphragm, brings its leading edge into engagement with the cam face 135 of the latching lever 88 of the shutter, thereby depressing the lever to partially trip the master lever and open the shutter for focusing. If the finger piece 88 of the latch lever is manually depressed, however, then flange 112 may be moved over it to open the diaphragm. In either case, the diaphragm cannot be opened unless the shutter is also opened for focusing. On opening the diaphragm by clockwise movement of flange 112, the flange holds finger piece 88 of the shutter latch lever depressed as long as the diaphragm is open, so that the master lever cannot be latched in set position, and the user of the camera is thus warned after focusing that the diaphragm must be closed before proceeding to make an exposure. On return of the flange 112 counterclockwise to initial position, the diaphragm is restored to any preadjusted aperture. The trigger remains locked against operation, however, as an indication that the master lever must be reset. The photographer is thus forced to set the master lever, thereby releasing the latching lever 85, closing the shutter blades also and releasing the trigger for operation in accordance with the usual procedure for making an exposure.

In the modified embodiment shown in Fig. 11, the latching lever 136 has a finger piece 137 which, instead of being cam-shaped for actuation by the diaphragm operating flange 112, has a rearwardly inclined or hook-shaped edge 138 adapted to block the movement of the flange 112 and thus prevent focusing opening of the diaphragm until after the focusing opening of the shutter. The shutter may be opened for focusing, as described above, by either manually depressing the finger piece 137 of the latch lever, or the latter may be provided with a plunger 139 sliding in a bearing 140 in the casing for engagement at its inner end with the latch lever to depress it and open the shutter blades. The diaphragm flange 112 may then be moved to open the diaphragm for focusing and serves as before to prevent operation of the master lever or the trigger until the diaphragm has been closed to its desired aperture setting.

In both of the above modifications, therefore, it is necessary after focusing to restore the diaphragm to its closed position or to its predetermined aperture setting and to reset the master lever, thus closing the shutter blades before the trigger can be released for operation, so that the mechanism is rendered substantially fool-proof in operation, as more fully described in my parent application.

It will be evident from the above description that in focusing the camera, it is necessary to first set the master lever and open the shutter blades manually, or by the opening of the diaphragm, for focusing, thereby in either case locking the trigger against actuation and preventing inadvertent operation until after the diaphragm has been closed to its preselected aperture, the shutter blades closed, and the master lever reset ready for an exposure.

The operation of the mechanism has been described in connection with its construction and it will be seen that the invention accomplishes its objects, and while it has been herein disclosed by reference to details of preferred embodiments, it is to be understood that such disclosure is intended in an illustrative, rather than a limiting sense, as it is contemplated that various other modifications in the construction and arrangement of the parts will readily occur to those skilled in the art, within the spirit of the invention and the scope of the appended claims.

I claim:

1. In a camera shutter of the setting type, the combination of a casing having an exposure opening, blades in said casing controlling said opening, a spring actuated master member provided with means for moving said blades, a spring actuated locking member for releasably holding said master member in set position, a trigger for actuating said locking member to release said master member, and focusing stop mechanism comprising a spring actuated latch lever in said casing having a manually operable part projecting externally thereof for actuating the same against the spring tension thereof, said latch lever having means movable to engage and actuate said locking member to release said master member when said latch lever is moved in one direction and movable out of the path of said locking lever when said latch lever is moved in the opposite direction, and means on said latch lever operable upon actuation thereof for engaging and latching said master member after release by said locking member in partially actuated position with said blades open, said latching means on said latch lever being disengageable to release said latch lever upon resetting of said master member.

2. In a camera shutter of the setting type, the combination of a casing having an exposure opening, blades in said casing controlling said opening, a spring actuated master member provided with means for moving said blades, a spring actuated locking member for releasably holding said master member in set position, a trigger for actuating said locking member to release said master member, and focusing stop mechanism comprising a spring actuated latch lever in said casing having a manually operable part projecting externally thereof for moving the same against the spring tension thereof, means operated by the movement of said latch lever for actuating said locking member to release said master member, and shoulder means on said latch lever and said master member cooperating upon actuation of said latch member for latching said master member when released by said locking member in partially actuated position with said blades open, said shoulder means being undercut for retaining said latch lever in latching position and for releasing the same upon resetting of said master member.

3. In a camera shutter of the setting type, the combination of a casing having an exposure opening, blades in said casing controlling said opening, a spring actuated master member provided with means for moving said blades, a spring actuated locking member for releasably holding said master member in set position, a trigger for actuating said locking member to release said master member, and focusing stop mechanism comprising a spring actuated latch lever in said casing having a manually operable part projecting externally thereof, means on said latch lever for engaging and moving said locking member to release said master member when said latch lever is moved in one direction and for releasing said locking member when said latch member is moved in the opposite direction, and shoulder means on said latch lever and master member cooperating upon actuation of said latch member for latching said master member after release by said locking member in partially actuated position with said blades open, said shoulder means being undercut to retain engagement thereof and to release the same and said latch lever upon resetting of said master member.

4. In a camera shutter of the setting type, the combination of a casing having an exposure opening, blades controlling said opening, a blade actuating ring, a locking member, a spring actuated master member movable manually against said spring to set position in locking engagement with said locking member, actuating means connecting said master member and blade ring for opening and closing said blades on release of said master member by said locking member, a trigger for tripping said locking member to release said master member, and focusing stop mechanism comprising a spring actuated latch member movable manually to focusing position against the action of said spring and provided with means operable during said movement thereof to trip said locking member for releasing said master member and to latch said master member in partially actuated position with said blades open, said master member being manually movable from said partially actuated position to reset the same and release said latching member for return to initial position, and said actuating means being operable to close said blades during said resetting movement of said master member.

5. In a camera shutter of the setting type, the combination of a casing having an exposure opening, blades controlling said opening, a blade actuating ring, a locking member, a spring actuated master member movable manually against said spring to set position in locking engagement with said locking member, actuating means connecting said master member and blade ring for opening and closing said blades on release of said master member by said locking member, a trigger operable in the set position of said master member for tripping said locking member to release said master member, and focusing stop mechanism comprising a spring actuated latch member movable manually to focusing position against the action of said spring and provided with means operable during said movement thereof to trip said locking member for releasing said master member independently of said trigger and to latch said master member in partially actuated position with said blades open, said master member being manually movable from said partially actuated position to reset the same and release said latching member for return to initial position, and said actuating means being operable to close said blades during said resetting movement of said master member.

6. In a camera shutter of the setting type, the combination of a casing having an exposure opening, blades controlling said opening, a blade actuating ring, a locking member, a spring actuated master member movable manually against said spring to set position in locking engagement with said locking member, actuating means connecting said master member and blade ring for opening and closing said blades on release of said master member by said locking member, a trigger for tripping said locking member to release said master member, and focusing stop mechanism comprising a spring actuated latch lever movable manually to focusing position against the action of said spring and provided with means operable during said movement thereof to trip said locking member for releasing said master member, and cooperating shoulder means on said latch lever and master member for latching said master member in partially actuated position with said blades open, said master member being manually movable from said partially actuated position to reset the same and release said latch lever for return to initial position, and said actuating means being operable to close said blades during said resetting movement of said master member.

7. In a camera shutter of the setting type, the combination of a casing having an exposure opening, blades controlling said opening, a blade actuating ring, a locking member, a spring actuated master member movable manually against said spring to set position in locking engagement with said locking member, actuating means connecting said master member and blade ring for opening and closing said blades on release of said master member by said locking member, a trigger operable in the set position of the master member for tripping said locking member to release said master member, and focusing stop mechanism comprising a spring actuated latch lever movable manually to focusing position against the action of said spring and provided with means operable during said movement thereof to trip said locking member for releasing said master member independently of said trigger, and cooperating shoulder means on said latch lever and master member for latching said master member in partially actuated position with said blades open, said master member being manually movable from said partially actuated position to reset the same and release said latch lever for return to initial position, and said actuating means being operable to close said blades during said resetting movement of said master member.

8. In a camera shutter of the setting type, the combination of a casing having an exposure opening, blades controlling said opening, a blade actuating ring, a pivoted locking lever, a spring actuated pivoted master lever movable manually against said spring to set position in locking engagement with said locking lever and having means projecting outside said casing for manually setting the same, actuating means connecting said master lever and blade ring for opening and closing said blades on release of said master lever by said locking lever, a trigger operable in the set position of said master lever for tripping said locking lever to release said master lever, and focusing stop mechanism comprising a spring actuated latch lever movable manually to focusing position against the action of said spring and provided with means operable during said movement thereof to trip said locking lever for releasing said master lever independently of said trigger, and cooperating shoulder means on said latch lever and master lever for latching said master lever in partially actuated position with said blades open, said master lever being manually movable from said partially actuated position to reset the same and release said latch lever for return to initial position, and said actuating means being operable to close said blades during said resetting movement of said master lever.

ALFRED SCHWARZ.

REFERENCES CITED

The following references are of record in the file of this patent:

UNITED STATES PATENTS

| Number | Name | Date |
|---|---|---|
| 1,687,123 | Deckel et al. | Oct. 9, 1928 |
| 2,105,228 | Riddell | July 11, 1938 |
| 2,183,802 | Zizelsberger | Dec. 19, 1939 |
| 2,206,132 | Stewart | July 20, 1940 |
| 2,249,540 | Riddell | July 15, 1940 |
| 2,333,820 | Riddell | Nov. 9, 1943 |
| 2,350,106 | Fuerst | May 30, 1944 |